(12) United States Patent
Urbani et al.

(10) Patent No.: US 12,030,784 B2
(45) Date of Patent: Jul. 9, 2024

(54) RECOVERY OF LITHIUM HYDROXIDE

(71) Applicant: Bright Minz Pty Ltd, West Perth (AU)

(72) Inventors: Mark Daniel Urbani, Wattle Grove (AU); Nicholas John Vines, High Wycombe (AU); Gary Donald Johnson, Subiaco (AU)

(73) Assignee: Bright Minz Pty Ltd, West Perth (AU)

( * ) Notice: Subject to any disclaimer, the term of this patent is extended or adjusted under 35 U.S.C. 154(b) by 518 days.

(21) Appl. No.: 17/428,482

(22) PCT Filed: Feb. 5, 2020

(86) PCT No.: PCT/AU2020/050090
§ 371 (c)(1),
(2) Date: Aug. 4, 2021

(87) PCT Pub. No.: WO2020/160615
PCT Pub. Date: Aug. 13, 2020

(65) Prior Publication Data
US 2022/0098049 A1 Mar. 31, 2022

(30) Foreign Application Priority Data

Feb. 5, 2019 (AU) .............................. 2019900356

(51) Int. Cl.
C02F 1/58 (2023.01)
C01D 15/02 (2006.01)
C22B 3/44 (2006.01)

(52) U.S. Cl.
CPC ............... *C01D 15/02* (2013.01); *C22B 3/44* (2013.01)

(58) Field of Classification Search
None
See application file for complete search history.

(56) References Cited

U.S. PATENT DOCUMENTS

| 2,931,703 A | 4/1960 | Reader | |
| 2013/0319951 A1* | 12/2013 | Smith | C02F 1/5245 |
| | | | 210/722 |

FOREIGN PATENT DOCUMENTS

| CN | 107128954 A | 9/2017 |
| RU | 2347829 C2 | 2/2009 |
| RU | 2546952 C1 | 4/2015 |

OTHER PUBLICATIONS

Bishimbayeva et al. Oriental Journal of Chemistry, 2018, 34 (6), 2762-2769 (Year: 2018).*

(Continued)

*Primary Examiner* — Yun Qian
(74) *Attorney, Agent, or Firm* — Nelson Mullins Riley & Scarborough LLP

(57) ABSTRACT

A process for the recovery of lithium hydroxide from lithium sulfate containing solutions, the process characterised by the following method steps:
  precipitating ettringite from a lithium sulfate containing solution in a primary ettringite precipitation step (100);
  subsequent recovery of a liquor (7, 11) containing lithium hydroxide; and
  producing a lithium hydroxide monohydrate product (22) from the lithium hydroxide liquor (7, 11).

17 Claims, 1 Drawing Sheet

(56) References Cited

OTHER PUBLICATIONS

Reinsel, M.A., A New Process for Sulfate Removal from Industrial Waters, In: Mining and Reclamation for the Next Millenium. Proceedings of the 16th Annual National Meeting of the American Society for Surface Mining and Reclamation, Scottsdale, AZ (US), by Bengson, SA and Bland, DM, Published Jul. 1, 1999, Abstract only.
International Search Report and Written Opinion, PCT/AU2020/050090, dated Apr. 17, 2020, 8 pages.
International Preliminary Report on Patentability, PCT/AU2020/050090, dated Aug. 10, 2021, 5 pages.
Office Action and Search Report from corresponding Chinese Patent Application No. 202080012700.6, dated Nov. 23, 2022, all enclosed pages cited (no English translation readily available).

* cited by examiner

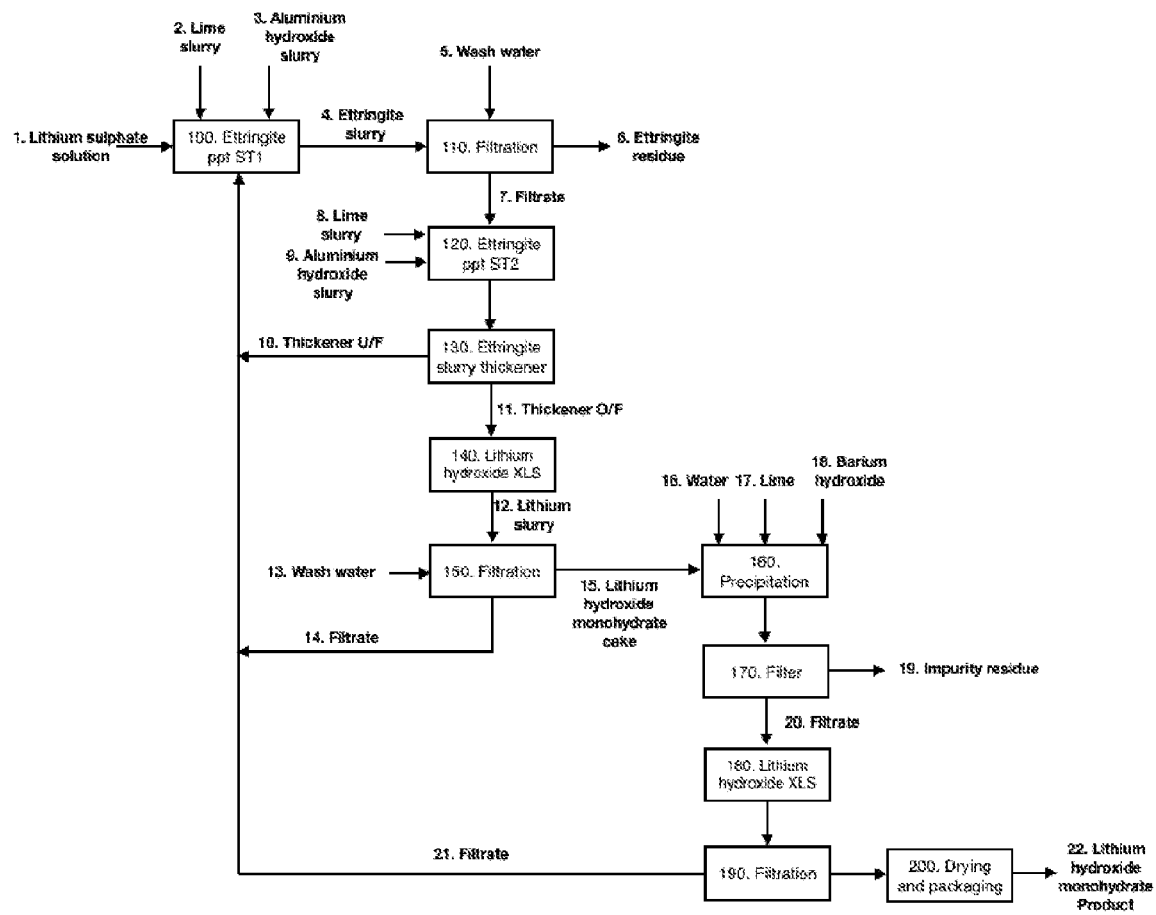

RECOVERY OF LITHIUM HYDROXIDE

CROSS-REFERENCE TO RELATED APPLICATIONS

This Application is a 35 U.S.C. § 371 national stage filing of International Application No. PCT/AU2020/050090 filed on Feb. 5, 2020, which claims the benefit of Australian Patent Application No. 2019900356, filed on Feb. 5, 2019. The entire contents of these applications are incorporated herein by reference in their entireties.

FIELD OF THE INVENTION

The present invention relates to a process for the recovery of lithium hydroxide from a solution containing lithium sulfate. More particularly, the process of the present invention is intended to allow the recovery of lithium hydroxide without the requirement of sodium hydroxide as a causticisation reagent.

BACKGROUND ART

The major sources of commercially mined lithium have historically been brine solution and hard rock spodumene containing ores. For processes that recover lithium from hard rock ores, the conventional approach is to convert alpha spodumene to beta spodumene by high temperature (>800° C.) decrepitation. The conversion enables chemical attack and subsequent extraction of lithium using, most commonly, sulfuric acid.

Post a series of impurity removal stages, lithium, which is present in solution as soluble lithium sulfate, is subsequently recovered as lithium hydroxide by way of the addition of sodium hydroxide as a causticisation reagent. The addition of sodium hydroxide produces a solution containing lithium, sodium, sulfate and hydroxide ions.

Sodium sulfate is recovered from solution by a double crystallisation process. The separation of sodium sulfate from lithium hydroxide is afforded by the lower solubility of hydrous sodium sulfate at low temperature. The recovery of sodium sulfate is necessary for this process, firstly to provide an outlet for sodium in the process, and secondly to enable recovery of lithium remaining in solution as lithium hydroxide.

The first stage involves the crystallisation of a hydrous sodium sulfate, commonly termed Glauber's salt, and the forced cooling of the solution. To afford acceptable recoveries of sodium sulfate, the solution must be cooled, generally to <10° C. The resultant slurry is subjected to solid liquid separation and washing to enable the recovery of lithium in the solution. The second stage involves the melting of the Glauber's salt and crystallisation of anhydrous sodium sulfate at elevated temperature. The resultant slurry is subject to solid liquid separation, and the residue is dried and packaged.

The solution, post the crystallisation of Glauber's salt, which contains lithium hydroxide and some sodium sulfate, is heated and subjected to evaporative crystallisation to produce a crude lithium hydroxide monohydrate product. This product is contaminated with sodium sulfate and requires further purification.

The crude lithium hydroxide monohydrate is dissolved in water and re-crystallised. The resultant slurry is subject to solid liquid separation, and the residue is dried and packaged. The solution, which contains sodium sulfate, is recycled up-stream.

The recovery of lithium hydroxide through this process is both operating cost and capital cost intensive. Of more concern is the potential oversupply of sodium sulfate as the demand for lithium chemicals increases. The inability to store sodium sulfate, which is highly water soluble, may inhibit the use of sodium hydroxide as a causticisation reagent for lithium hydroxide.

Some removal of sulfate from waste solutions saturated with calcium sulfate through the precipitation of ettringite has been demonstrated previously. The Cost-Effective Sulfate Removal (CESR) process, from Hydrometrics, Inc., uses a specialised and proprietary powdered cement (reagent), which is a hydrated calcium aluminum sulfate compound, and lime at a pH of about 11.3 for ettringite precipitation (refer Reinsel, M. A., *A New Process for Sulfate Removal from Industrial Waters*, In: Mining and Reclamation for the Next Millenium. Proceedings of the 16$^{th}$ Annual National Meeting of the American Society for Surface Mining and Reclamation, Scottsdale, AZ (US), by Bengson, S A and Bland, D M). This process can achieve sulfate concentrations significantly below the calcium sulfate solubility.

The SAVMIN™ process was developed by Mintek to treat acid mine drainage. Ettringite is precipitated in one of several stages in the overall process, as in the CESR process, and is achieved through the recycling of aluminum hydroxide. Sulfate levels can be reduced to less than 200 mg/L by this process.

Both the CESR and SAVMIN™ processes are known to have been developed to treat solutions saturated in calcium sulfate, with the aim of reducing the soluble sulfate concentration to low levels. Neither process was developed for the processing of solutions containing high monovalent sulfate concentrations, nor were they developed for the production of monovalent hydroxide salts.

The recovery process of the present invention has as one object thereof to substantially overcome the problems associated with the prior art or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia or any other country or region as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a process for the recovery of lithium hydroxide from lithium sulfate containing solutions, the process characterised by the following method steps:
  precipitating ettringite from a lithium sulfate containing solution in a primary ettringite precipitation step;
  subsequent recovery of a liquor containing lithium hydroxide; and
  producing a lithium hydroxide monohydrate product from the lithium hydroxide liquor.

Preferably, lithium sulfate in the lithium sulfate containing solution is converted to lithium hydroxide by way of the addition of lime and an aluminium hydroxide containing reagent or mineral.

The aluminium hydroxide containing reagent or mineral may be provided in the form of refined gibbsite, bauxite ore or the like.

The chemistry for the precipitation of ettringite is understood to be as follows:

$$3Li_2SO_{4(aq)} + 2Al(OH)_{3(s)} + 6Ca(OH)_{2(s)} + 26H_2O \rightarrow Ca_6Al_2(SO_4)_3(OH)_{12} \cdot 26H_2O_{(s)} + 6LiOH_{(aq)}$$

Preferably, a slurry resulting from the precipitation of ettringite is subjected to a solid liquid separation step, and washing, to recover lithium to the liquor or solution. The residue, containing ettringite, and some lithium, may be used as a neutralising agent in a preceding step utilised for the production of the lithium sulfate containing solution.

Preferably, the solution from solid liquid separation and washing contains lithium hydroxide and some minor impurities. Still preferably, the minor impurities may include calcium and aluminium. The minor impurities may ultimately be removed by precipitation to provide a purified solution.

Still preferably, the solution from solid liquid separation and washing is passed to a secondary ettringite precipitation step. The secondary ettringite precipitation step preferably comprises the addition of lime and an aluminium hydroxide containing reagent or mineral. The aluminium hydroxide containing reagent or mineral may again preferably be provided in the form of refined gibbsite, bauxite ore or the like.

The product of the secondary ettringite precipitation step is preferably passed to a solid liquid separation step to provide a liquor containing lithium hydroxide. The solids or residue from solid liquid separation are preferably recycled to the primary ettringite precipitation step.

The liquor containing lithium hydroxide is preferably subjected to a crystallisation step to recover a crude lithium hydroxide monohydrate. The resultant slurry is subject to solid liquid separation and the solids therefrom passed to an impurities precipitation step. The filtrate from solid liquid separation is recycled to the primary ettringite precipitation step.

The impurities precipitation step comprises a first re-dissolution of the crude lithium hydroxide monohydrate in water prior to a subsequent precipitation of impurities. The precipitation of impurities is preferably achieved through the addition of lime and barium hydroxide. The impurities that are precipitated preferably include one or more of calcium, aluminium, sulfur and carbon.

A product of the impurities precipitation step is preferably passed to a solid liquid separation step that provides an impurity residue and liquor containing lithium hydroxide monohydrate. The liquor containing lithium hydroxide is preferably passed to a crystallisation step to crystallise lithium hydroxide monohydrate that is in turn passed to a solid liquid separation step that preferably further comprises washing. From this solid liquid separation step a filtrate is preferably recycled to the first ettringite precipitation stage and the crystallised lithium hydroxide monohydrate is preferably dried and packaged to provide a final lithium hydroxide monohydrate product.

In accordance with the present invention there is further provided a process for the recovery of lithium hydroxide from lithium sulfate containing solutions, the process characterised by the following method steps:

(i) A primary precipitation of ettringite from a solution containing lithium sulfate through the addition of lime and aluminium hydroxide;

(ii) Solid liquid separation and washing of the precipitated ettringite to recover a liquor containing lithium hydroxide;

(iii) A secondary precipitation of ettringite from a liquor recovered from step (ii) through the addition of lime and aluminium hydroxide, to increase the extent of the reaction;

(iv) Solid liquid separation to recover a liquor containing lithium hydroxide and the recycle of the solids to step (i);

(v) Crystallisation of crude lithium hydroxide monohydrate from the liquor of step (iv) through evaporation and subsequent solid liquid separation;

(vi) Re-dissolution of crude lithium hydroxide in water and precipitation of impurities, such as calcium, aluminium sulphur and carbon with lime and barium hydroxide;

(vii) Solid liquid separation to recover a liquor containing lithium hydroxide;

(viii) Crystallisation of lithium hydroxide monohydrate from the liquor through evaporation and subsequent solid liquid separation, washing drying and packaging; and (ix) Recycle of the filtrates or liquors from the solid liquid separation step (ii) and step (viii) to the ettringite precipitation stage, step (i).

The separation of the precipitated ettringite from the liquor is preferably achieved by filtration or decantation, and the resulting filtrate preferably contains the large majority of lithium contained in the lithium sulfate as lithium hydroxide. In one form of the present invention, the large majority is understood to include greater than about 60% of the lithium contained in the lithium sulfate as lithium hydroxide.

Separation of the crystallised lithium hydroxide monohydrate from the liquor is achieved by filtration or decantation in which the resulting filtrate is recycled to ettringite precipitation. Washing of the crystallised lithium hydroxide monohydrate substantially removes entrained impurities.

Preferably, the ettringite precipitation steps are operated in a temperature range of ambient to about 100° C., and at atmospheric pressure.

Still preferably, the ettringite precipitation steps are operated at >50° C. and at atmospheric pressure.

Preferably, the ettringite precipitation steps are carried out with stoichiometric or greater levels of reagent addition.

The or each ettringite precipitation step has a retention time of:
(i) up to about 6 hours;
(ii) between about 15 minutes and 6 hours; or
(iii) between about 1 hour and 2 hours.

Preferably, in the first ettringite precipitation step, the sulfur precipitation reaction extent exceeds about 60%, and in the second ettringite precipitation step the sulfur precipitation extent exceeds about 70%.

The minor impurities removed in the precipitation step preferably include one or both of calcium and aluminium.

Still preferably, the lithium hydroxide monohydrate product obtained using the process of the present invention is of battery grade.

BRIEF DESCRIPTION OF THE DRAWINGS

The process of the present invention will now be described, by way of example only, with reference to one embodiment thereof and the accompanying drawings, in which:

FIG. 1 is a flow sheet depicting a process for the recovery of lithium hydroxide from lithium sulfate containing solution in accordance with the present invention.

BEST MODE(S) FOR CARRYING OUT THE INVENTION

The present invention provides a process for the recovery of lithium hydroxide from lithium sulfate containing solutions, the process characterised by the following method steps:

precipitating ettringite from a lithium sulfate containing solution;

subsequent recovery of a liquor containing lithium hydroxide; and producing a lithium hydroxide monohydrate product from the lithium hydroxide liquor.

Lithium sulfate in the lithium sulfate containing solution is converted to lithium hydroxide by way of the addition of lime and an aluminium hydroxide containing reagent or mineral. The aluminium hydroxide containing reagent or mineral may be provided in the form of refined gibbsite, bauxite ore or the like.

The chemistry for the precipitation of ettringite is understood to be as follows:

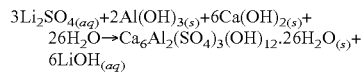

$3Li_2SO_{4(aq)} + 2Al(OH)_{3(s)} + 6Ca(OH)_{2(s)} + 26H_2O \rightarrow Ca_6Al_2(SO_4)_3(OH)_{12} \cdot 26H_2O_{(s)} + 6LiOH_{(aq)}$ A slurry resulting from the precipitation of ettringite is subjected to a solid liquid separation step, and washing, to recover lithium to the liquor or solution. The residue, containing ettringite, and some lithium, may be used as a neutralising agent in a preceding step utilised for the production of the lithium sulfate containing solution.

The solution from solid liquid separation and washing contains lithium hydroxide and some minor impurities. The minor impurities may include calcium and aluminium. The minor impurities may ultimately be removed by precipitation to provide a purified solution.

The solution from solid liquid separation and washing is passed to a secondary ettringite precipitation step. The secondary ettringite precipitation step comprises the addition of lime and an aluminium hydroxide containing reagent or mineral. The aluminium hydroxide containing reagent or mineral may again be provided in the form of refined gibbsite, bauxite ore or the like.

The product of the secondary ettringite precipitation step is passed to a solid liquid separation step to provide a liquor containing lithium hydroxide. The solids or residue from solid liquid separation are recycled to the first ettringite precipitation step.

The liquor containing lithium hydroxide is subjected to a crystallisation step to recover a crude lithium hydroxide monohydrate. The resultant slurry is subject to solid liquid separation and the solids therefrom passed to an impurities precipitation step. The filtrate from solid liquid separation is recycled to the primary ettringite precipitation step.

The impurities precipitation step comprises a first re-dissolution of the crude lithium hydroxide monohydrate in water prior to a subsequent precipitation of impurities. The precipitation of impurities is achieved through the addition of lime and barium hydroxide. The impurities that are precipitated include one or more of calcium, aluminium, sulfur and carbon.

A product of the impurities precipitation step is passed to a solid liquid separation step that provides an impurity residue and liquor containing lithium hydroxide monohydrate. The liquor containing lithium hydroxide is passed to a crystallisation step to crystallise lithium hydroxide monohydrate that is in turn passed to a solid liquid separation step that further comprises washing. From this solid liquid separation step a filtrate is recycled to the primary ettringite precipitation stage and the crystallised lithium hydroxide monohydrate is dried and packaged to provide a final lithium hydroxide monohydrate product.

The process of the present invention may be better understood with reference to the following non-limiting example.

EXAMPLE

One example of the process of the present invention provides a process for the recovery of lithium hydroxide from lithium sulfate containing solutions, the process characterised by the following method steps:

(i) A primary precipitation of ettringite from a solution containing lithium sulfate through the addition of lime and aluminium hydroxide;

(ii) Solid liquid separation and washing of the precipitated ettringite to recover a liquor containing lithium hydroxide;

(iii) A secondary precipitation of ettringite from a liquor recovered from step (ii) through the addition of lime and aluminium hydroxide, to increase the extent of the reaction;

(iv) Solid liquid separation to recover a liquor containing lithium hydroxide and the recycle of the solids to step (i);

(v) Crystallisation of crude lithium hydroxide monohydrate from the liquor of step (iv) through evaporation and subsequent solid liquid separation;

(vi) Re-dissolution of crude lithium hydroxide in water and precipitation of impurities, such as calcium, aluminium sulphur and carbon with lime and barium hydroxide;

(vii) Solid liquid separation to recover a liquor containing lithium hydroxide;

(viii) Crystallisation of lithium hydroxide monohydrate from the liquor through evaporation and subsequent solid liquid separation, washing drying and packaging; and (ix) Recycle of the filtrates or liquors from the solid liquid separation step (ii) and step (viii) to the ettringite precipitation step (i).

The separation of the precipitated ettringite from the liquor is achieved by filtration or decantation, and the resulting filtrate contains the large majority, for example greater than about 60%, of the lithium contained in the lithium sulfate as lithium hydroxide.

Separation of the crystallised lithium hydroxide monohydrate from the liquor is achieved by filtration or decantation in which the resulting filtrate is recycled to ettringite precipitation. Washing of the crystallised lithium hydroxide monohydrate substantially removes entrained impurities.

The ettringite precipitation steps are operated in a temperature range of ambient to about 100° C., for example >50° C., and at atmospheric pressure.

In the first ettringite precipitation step, the sulfur precipitation reaction extent exceeds about 60%, and in the second ettringite precipitation step the sulfur precipitation extent exceeds about 70%.

The ettringite precipitation steps are carried out with stoichiometric or greater levels of reagent addition.

The or each ettringite precipitation step has a retention time of:
(i) up to about 6 hours;
(ii) between about 15 minutes and 6 hours; or
(iii) between about 1 hour and 2 hours.

Lithium sulfate solution is treated in accordance with the present invention as shown in FIG. 1.

In FIG. 1 there is shown a flow sheet in accordance with the present invention and in which the embodiment depicted is particularly intended for the processing of lithium sulfate containing liquor to recover lithium as lithium hydroxide monohydrate 22.

A lithium sulfate containing solution 1, a lime slurry 2 and an aluminium hydroxide slurry 3 are directed to a primary ettringite precipitation step 100 operating at between about 50 and 100° C., and atmospheric pressure, to precipitate ettringite. The primary ettringite precipitation step 100 proceeds over a retention time of about 2 hours and achieves a precipitation extent of over about 60% of sulfate precipitation.

A resulting ettringite slurry 4 is directed to a filtration step 110 conducted using for example a plate and frame pressure filter, which enables the slurry 4 to be filtered. The solids, for example a filter cake from the pressure filter, are washed with water 5 to recover to the filtrate 7 any lithium entrained in the filter cake.

An ettringite residue 6 from the pressure filter can be passed to tailings, or re-cycled up stream to make use of the alkaline properties, for instance neutralising free acid in a step that might precede the production of lithium sulfate solution. In doing so, lithium entrained in the ettringite filter cake is able to be recovered through the remainder of the process of the present invention.

The lithium hydroxide containing filtrate 7, a lime slurry 8 and an aluminium hydroxide slurry 9 are directed to a secondary ettringite precipitation step 120 to increase the sulfate precipitation extent to over about 70%. The secondary ettringite precipitation step 120 operates at the same conditions as the primary ettringite precipitation step 100. The resulting ettringite slurry is directed to a solid liquid separation step 130, conducted for example using a thickener, which produces a thickened slurry 10 as thickener underflow. The thickened slurry is directed to the primary precipitation step 100.

A thickener overflow 11, from the solid liquid separation step 130, contains lithium hydroxide and minimal impurities. The impurities remaining at this point in the process typically include about 6 gpl S, about 20 ppm Ca, about 100 ppm Al, and less than about 2 gpl Na and K. The thickener overflow 11 is directed to a lithium hydroxide crystalliser 140. In this stage, water is evaporated to concentrate the liquor and force the crystallisation of a crude lithium hydroxide monohydrate.

A lithium slurry 12 from the crystalliser 140 is directed to a filtration step 150, conducted for example using a centrifuge. A resulting centrifuge cake 15 is washed with water 13 to remove impurities.

The filtrate 11 from the filtration step 150 contains lithium hydroxide and sulphate in solution. This liquor is directed to the primary ettringite precipitation step 100. This enables a high recovery of lithium to the lithium hydroxide monohydrate product 22.

The 'crude' lithium hydroxide monohydrate cake 15, containing at this point about 3000 ppm S, Ca and Al, and low levels of carbon, is removed from the centrifuge and directed to an impurity precipitation stage 160. The cake 15 is re-pulped in water 16, and reagents lime 17 and barium hydroxide 18 are used to precipitate impurities from the dissolved lithium hydroxide.

The resulting impurity precipitation slurry is directed to a solid liquid separation step 170, for example a filter, which enables the slurry to be filtered. A filtrate 20 is directed to a lithium hydroxide crystalliser 180. In this stage, water is evaporated to concentrate the liquor and force the crystallisation of lithium hydroxide monohydrate.

A lithium slurry from the crystalliser 180 is directed to a filtration step 190, for example conducted using a centrifuge. A centrifuge cake from the filtration step 190 is washed with water to remove impurities. A filtrate 21 from the filtration step 190 is returned to the primary ettringite precipitation step 100.

The cake from the filtration step 190, containing lithium hydroxide monohydrate, is removed from the centrifuge and directed to a drying and packaging plant 200, thereby providing the final lithium hydroxide monohydrate product 22.

It is envisaged that one form of the process of the present invention may be operated using only a single ettringite precipitation stage, although sulfate precipitation levels will be understood to be impacted by any such decision.

It is further envisaged that the process of the present invention provides a battery grade lithium hydroxide monohydrate product. The term "battery grade" refers to a product have a purity of about 99% or higher.

Modifications and variations such as would be apparent to the skilled addressee are considered to fall within the scope of the present invention.

The invention claimed is:

1. A process for the recovery of lithium hydroxide from lithium sulfate containing solutions, the process characterised by the following method steps:
   precipitating ettringite from a lithium sulfate containing solution in a primary ettringite precipitation step;
   subsequent recovery of a liquor containing lithium hydroxide; and
   producing a lithium hydroxide monohydrate product from the lithium hydroxide liquor.

2. The process of claim 1, wherein lithium sulfate in the lithium sulfate containing solution is converted to lithium hydroxide by way of the addition of lime and an aluminium hydroxide containing reagent or mineral.

3. The process of claim 2, wherein the aluminium hydroxide containing reagent or mineral is provided in the form of refined gibbsite or bauxite ore.

4. The process of claim 1, wherein a slurry resulting from the precipitation of ettringite is subjected to a solid liquid separation step, and optionally washing, to recover lithium to the liquor or solution.

5. The process of claim 4, wherein a residue of the solid liquid separation step, containing ettringite and some lithium, is used as a neutralising agent in a preceding step utilised for the production of the lithium sulfate containing solution.

6. The process of claim 4, wherein the liquor or solution from solid liquid separation contains lithium hydroxide and some minor impurities, the minor impurities optionally including calcium and aluminium and the minor impurities are ultimately further optionally removed by precipitation to provide a purified solution.

7. The process of claim 4, wherein the solution from solid liquid separation is passed to a secondary ettringite precipitation step.

8. The process of claim 4, wherein the solution from solid liquid separation is passed to a secondary ettringite precipitation step comprising the addition of lime and an aluminium hydroxide containing reagent or mineral, the aluminium hydroxide containing reagent or mineral is optionally provided in the form of refined gibbsite or bauxite ore.

9. The process of claim 4, wherein the solution from solid liquid separation is passed to a secondary ettringite precipitation step, a product of the secondary ettringite precipitation step being passed to a solid liquid separation step to provide a liquor containing lithium hydroxide, and the solids or residue from the solid liquid separation step are optionally recycled to the primary ettringite precipitation step and the liquor containing lithium hydroxide is optionally subjected to a crystallisation step to recover a crude lithium hydroxide monohydrate, a slurry produced in the crystallisation step is subject to solid liquid separation and the solids therefrom passed to an impurities precipitation step and a filtrate from solid liquid separation is recycled to the primary ettringite precipitation step.

10. The process of claim 4, wherein the solution from solid liquid separation is passed to a secondary ettringite precipitation step, a product of the secondary ettringite precipitation step being passed to a solid liquid separation step to provide a liquor containing lithium hydroxide, and the solids or residue from the solid liquid separation step are optionally recycled to the primary ettringite precipitation step and the liquor containing lithium hydroxide is subjected to a crystallisation step to recover a crude lithium hydroxide monohydrate, a slurry produced in the crystallisation step is subject to solid liquid separation and the solids therefrom passed to an impurities precipitation step, the impurities precipitation step comprising a first re-dissolution of the crude lithium hydroxide monohydrate in water prior to a subsequent precipitation of impurities, the precipitation of impurities optionally being achieved through the addition of lime and barium hydroxide to precipitate one or more of calcium, aluminium, sulfur and carbon.

11. The process of claim 4, wherein the solution from solid liquid separation is passed to a secondary ettringite precipitation step, a product of the secondary ettringite precipitation step being passed to a solid liquid separation step to provide a liquor containing lithium hydroxide, and the solids or residue from the solid liquid separation step are optionally recycled to the primary ettringite precipitation step and the liquor containing lithium hydroxide is subjected to a crystallisation step to recover a crude lithium hydroxide monohydrate, a slurry produced in the crystallisation step is subject to solid liquid separation and the solids therefrom passed to an impurities precipitation step, the impurities precipitation step comprising a first re-dissolution of the crude lithium hydroxide monohydrate in water prior to a subsequent precipitation of impurities, a product of the impurities precipitation step being passed to a solid liquid separation step that provides an impurity residue and liquor containing lithium hydroxide monohydrate.

12. The process of claim 4, wherein the solution from solid liquid separation is passed to a secondary ettringite precipitation step, a product of the secondary ettringite precipitation step being passed to a solid liquid separation step to provide a liquor containing lithium hydroxide, and the solids or residue from the solid liquid separation step are optionally recycled to the primary ettringite precipitation step and the liquor containing lithium hydroxide is subjected to a crystallisation step to recover a crude lithium hydroxide monohydrate, a slurry produced in the crystallisation step is subject to solid liquid separation and the solids therefrom passed to an impurities precipitation step, the impurities precipitation step comprising a first re-dissolution of the crude lithium hydroxide monohydrate in water prior to a subsequent precipitation of impurities, a product of the impurities precipitation step being passed to a solid liquid separation step that provides an impurity residue and liquor containing lithium hydroxide monohydrate, wherein the liquor containing lithium hydroxide is passed to a crystallisation step to crystallise lithium hydroxide monohydrate that is in turn passed to a solid liquid separation step, from which a filtrate is optionally recycled to the primary ettringite precipitation stage and the crystallised lithium hydroxide monohydrate dried and packaged to provide a final lithium hydroxide monohydrate product.

13. The process of claim 4, wherein the solution from solid liquid separation is passed to a secondary ettringite precipitation step, the ettringite precipitation steps being operated in a temperature range of ambient to about 100° C. and at atmospheric pressure.

14. The process of claim 4, wherein the solution from solid liquid separation is passed to a secondary ettringite precipitation step, the ettringite precipitation steps being operated at >50° C. and at atmospheric pressure.

15. The process of claim 4, wherein the solution from solid liquid separation is passed to a secondary ettringite precipitation step, the ettringite precipitation steps being carried out with stoichiometric or greater levels of reagent addition.

16. The process of claim 4, wherein the solution from solid liquid separation and washing is passed to a secondary ettringite precipitation step, the or each ettringite precipitation step having a retention time of:
   a. up to about 6 hours;
   b. between about 15 minutes and 6 hours; or
   c. between about 1 hour and 2 hours.

17. The process of claim 1, wherein the lithium hydroxide monohydrate product obtained is of battery grade.

\* \* \* \* \*